United States Patent [19]

Bryant

[11] Patent Number: 4,642,473

[45] Date of Patent: Feb. 10, 1987

[54] ELECTRICAL CIRCUIT ARRANGEMENT AND ELECTRICAL CIRCUIT UNIT FOR USE IN SUCH AN ELECTRICAL CIRCUIT ARRANGEMENT

[75] Inventor: Stewart F. Bryant, Redhill, England

[73] Assignee: U.S. Philips Corporation, New York, N.Y.

[21] Appl. No.: 713,968

[22] Filed: Mar. 20, 1985

[30] Foreign Application Priority Data

Mar. 23, 1984 [GB] United Kingdom ................ 8407620

[51] Int. Cl.$^4$ ................................................ H02J 1/00
[52] U.S. Cl. ....................................... 307/38; 307/40; 307/41
[58] Field of Search ............................. 307/38, 40, 41

[56] References Cited

U.S. PATENT DOCUMENTS

| | | | |
|---|---|---|---|
| 4,000,487 | 12/1976 | Patterson et al. | 364/200 |
| 4,280,199 | 7/1981 | Osakabe et al. | 365/236 |
| 4,458,357 | 6/1984 | Weymouth et al. | 377/2 |

Primary Examiner—William M. Shoop, Jr.
Assistant Examiner—Sharon D. Logan
Attorney, Agent, or Firm—Jack E. Haken; James J. Cannon, Jr.

[57] ABSTRACT

A circuit arrangement having a plurality of circuit units (1-1 to 1-n) each circuit unit (1-1 to 1-n) having an input AI and and output AO. Each circuit unit (1-1 to 1-n) includes an address generator which is incremented by a clock signal applied via terminal. Incrementation of the clock generator is inhibited when a logical '1' is applied to the input AI of a circuit unit. In order to generate addresses for all the circuit units they are connected in a daisy chain with the AO output of each circuit unit being connected to the AI input of the next circuit in the chain. The circuit units (1-1 to 1-n) are arranged so that when a logical '1' is applied to its AI input a logical '1' appears at its AO output one clock period later. A monitoring unit may be provided to detect when all addresses have been set up by monitoring the state of the AO output of the last circuit unit (1-n) in the chain. This arrangement enables unique addresses to be allocated to all the circuit units while allowing each of the circuit units to be manufactured in identical form.

25 Claims, 6 Drawing Figures

ELECTRICAL CIRCUIT ARRANGEMENT AND ELECTRICAL CIRCUIT UNIT FOR USE IN SUCH AN ELECTRICAL CIRCUIT ARRANGEMENT

BACKGROUND OF THE INVENTION

The invention relates to an electrical circuit arrangement comprising a plurality of circuit units connected to a common path and to an electrical circuit unit for use in such an electrical circuit arrangement.

One problem is designing and constructing electronic systems which include a plurality of circuit units is the assignment to each circuit unit of a unique identity or address. Such circuit units may be RAMs, ROMs, Codecs, etc. which may be, for example, in the form of integrated circuits, hybrid circuits or printed circuit boards carrying a plurality of discrete and/or integrated circuits. One possibility is to assign an address to each circuit unit at the manufacturing state, but this leads both to more expensive circuit units and to a greater possibility of inserting the circuit units into the wrong position within the system. Another possibility is to provide each circuit unit with a number of programming pins which are connected to internal decoding circuitry and to external potentials either directly or through switches. These two possibilities may be combined so that part of the address is fixed at the manufacturing stage and part is programmable. The fixed portion of the address normally indicates the type of circuit, i.e. RAM, Codec, etc., while the programmable part identifies the particular circuit of that type. This reduces the number of external pins required which is particularly important when the circuit unit is formed as an integrated circuit since the cost of an integrated circuit increases significantly with each additional pin provided. However the number of circuit units which can be addressed is limited if the number of programming pins is not to become excessive. A further possibility is to provide an external address decoding circuit feeding an enable pin on the integrated circuit. This reduces the number of addressing pins required to one but has the disadvantage that additional circuit elements have to be provided to enable addressing to be effected thus increasing the cost and complexity of the system.

When the circuit units are formed as printed circuit boards (PCBs) which are plugged into either a mother board or a wiring frame it is usual to provide programming switches on the PCB which are appropriately set to give the PCB address. This arrangement has a number of disadvantages amongst which are the difficulties involved with mounting and soldering the switches to the PCB, the possibility of incorrectly setting the switches, and the area of the PCB occupied by the switches which reduces the available board area for the functional parts of the circuit unit.

U.K. Patent Specification No. 1295332 discloses an electrical circuit arrangement and an electrical circuit unit as set forth in the first and second paragraphs. The description with reference to FIGS. 6 and 7 of that specification shows a circuit arrangement comprising a plurality of terminals arranged along a transmission line at approximately 10 meter intervals. Each terminal includes an address generator which is incremented by a clock signal applied thereto via a gate which is opened and closed by a start and a stop signal transmitted along the transmission line. Each terminal is provided with a high frequency (10 MHz) clock signal generator. By using the signal propagation delay along the transmission line and ensuring a minimum spacing between terminals a difference in time of opening of the gate in each terminal can be achieved such that the difference is greater than the period of the clock signal. Hence each address generator will provide a different address. This circuit arrangement may be satisfactory where a large spacing between terminals is possible, though it may also impose stringent requirements on the clock signal generators, but is impracticable when the terminals are separated by small distances since the required clock frequency would be correspondingly increased.

U.S. Pat. No. 4,458,357 discloses apparatus for automatically producing a unique identification code (or address) for a number of circuit boards in an electronic system. Each circuit board includes a counter to which the system clock is applied, the counter also having an inhibit input to which a signal may be applied to prevent the counter from counting. Initially all the counters are inhibited and a system rest signal presets all the counters to a maximum count. The counter on the first board is then enabled and starts to count down. As soon as the count changes an enable signal is transferred to the next board. This process is continued until the counter on the final board is enabled and changes count when a disable signal is generated and applied to all the counters simultaneously. Thus all the boards are allocated a unique address, the first board having the lowest numbered address, but the actual address will depend on the number of boards present.

A disadvantage of this arrangement is that an external connection to each board is required for both the counter enable and disable signals. Also two conductors are required on the mother board connecting the circuit boards. The number of pins on each circuit board and available area on mother boards for the circuit board interconnections is frequently limited.

It is an object of the invention to overcome the disadvantages of the prior art systems disclosed in U.K. Patent No. 1295332 and U.S. Pat. No. 4,458,357.

It is a further object of the invention to reduce the number of interconnections required between the circuit units.

SUMMARY OF THE INVENTION

The invention provides an electrical circuit arrangement comprising a plurality of circuit units connected to a common path, each of the circuit units having an input for receiving a control signal and including a control circuit, said control circuit having a first input for receiving a clock signal, a second input connected to the control signal input and an output connected to an input of an address generator, said address generator being provided for generating addresses in response to said clock signal applied thereto under control of said control signal, wherein said circuit arrangement further comprises a control arrangement for generating successive control signals synchronously with the clock signal, said control arrangement having a plurality of outputs, an individual output of the control arrangement being connected to the control signal input of a respective circuit unit.

The control arrangement requires only one input on each circuit unit to control the address generator and thus the number of external connections to the circuit units is reduced compared with the number required in the system disclosed in the aforementioned U.S. Patent.

The control arrangement may comprise a parallel output shift register, each individual output of the shift register being connected to a respective output of the control arrangement. This provides a particularly simple implementation of the control arrangement.

At least one circuit unit may comprise means for enabling the control signal input to be used for other circuit functions once the address generator has generated the address. This further reduces the number of external connections to the circuit unit. Once the address has been generated no external connections are required for the address generation and thus the total number of external connections can be determined merely by those required for the functional portions of the units.

The enabling means may comprise a changeover switch having its pole connected to the control signal input, a first contact connected to the second input of the control circuit and a second contact connected to a further portion of the circuit unit; and a clocked bistable circuit having an input connected to the control signal input and an output connected to a control input of the changeover switch, a change in the signal at the output of the bistable circuit being effective to cause the changeover switch to change state.

A circuit unit may include means for changing the address generated by the address generator in response to appropriate signals applied to the circuit unit. Thus having set up an initial addressing scheme this may subsequently be altered. This may be advantageous in systems such as I²C Bus where the priority given to a given circuit unit depends on its address. By arranging for the address to be alterable the priority given to a particular circuit unit can be changed at will and need not depend on its physical position within the system.

A further embodiment of the invention provides an electrical circuit arrangement comprising a plurality of circuit units connected to a common path, each of the circuit units having an input for receiving a control signal and including a control circuit having a first input for receiving a clock signal, a second input connected to the control signal input and an output connected to an input of an address generator, said address generator being provided for generating addresses in response to said clock signal applied thereto under control of said control signal, said circuit arrangement further comprising a control arrangement for generating successive control signals synchronously with the clock signal, said control arrangement comprising a sub-arrangement in each circuit unit, a first input of each sub-arrangement being connected to the control signal input of its respective circuit unit, said clock signal being applied to a second input of each sub-arrangement and an output of each sub-arrangement being connected to a control signal output of its respective circuit unit, each sub-arrangement being provided for generating one of said successive control signal subsequent to receipt of a control signal on its first input, the control signal output of each circuit unit being connected to the control signal input of at least one succeeding unit when present, at least one circuit unit comprising means for enabling the control signal input and the control signal output to be used for other circuit functions once the address generator has been generated the address.

In this arrangement the circuit units may be connected in a chain with the signal on the control signal input of the first unit in the chain being applied to each succeeding link in the chain at clock pulse intervals thus enabling each unit to count one more clock pulse than the preceding unit in the chain and automatically allocating consecutive addresses to each unit along the chain. It should be noted that since the links between the units will normally be conductive tracks on a printed circuit board or wire links between printed circuit boards successive units along the chain need not be physically adjacent to each other. The links between the units can be arranged to give any of the units an arbitary place along the chain. This may be important when the circuit arrangement is formed from integrated circuits connected to an I²C bus where the priority of a particular circuit unit depends on its address. The I²C bus is described in, for example Electronic Components and Applications, Volume 5, No. 1, November 1982, pages 19 and 20 and European Patent Application No. 0051332A.

The inclusion of means for enabling the control signal input and/or output to be used for other purposes further reduces the number of external terminals required by the circuit unit. Examples of other system functions where daisy chained lines are already used are the interrupt priority lines IACKIN and IACKOUT in the VME Bus and IEI and IEO in the Z80 microcomputer system of Zilog Inc.

The application of the clock signal to the address generator of a circuit unit may be inhibited in response to the control signal applied to the control signal input. Thus by causing all the address generators to start counting on switch on and by sequentially applying the control signal to the circuit units only one control signal input is required in each circuit unit.

A still further embodiment of the invention provides an electrical circuit arrangement comprising a plurality of circuit units connected to a common path and a control arrangement for generating successive control signals synchronously with a clock signal: in which each circuit unit comprises (a) a control signal input for receiving a control signal,
(b) a control signal output for outputting a control signal,
(c) a control circuit,
(d) an address generator, and
(e) a sub-arrangement of said control arrangement:

wherein said control circuit has a first input for receiving said clock signal, a second input connected to said control signal input and an output connected to an input of said address generator; said address generator is provided for generating addresses in response to said clock signal, said clock signal being applied to said address generator under the control of said control signal; said sub-arrangement having a first input connected to the control signal input, a second input for receiving said clock signal, and an output connected to the control signal output, said sub-arrangement being provided for generating one of said one of said successive control signals at its output subsequent to the receipt of a control signal at its first input;

and wherein the circuit units are arranged such that the control signal output of one is connected to the control signal input of the next, if present, the control arrangement is arranged to supply a signal to the control signal input of the first circuit unit, and the control circuit of each circuit unit is arranged to inhibit the application of said clock signal to the address generator when a control signal is applied to the control signal input of that circuit unit.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
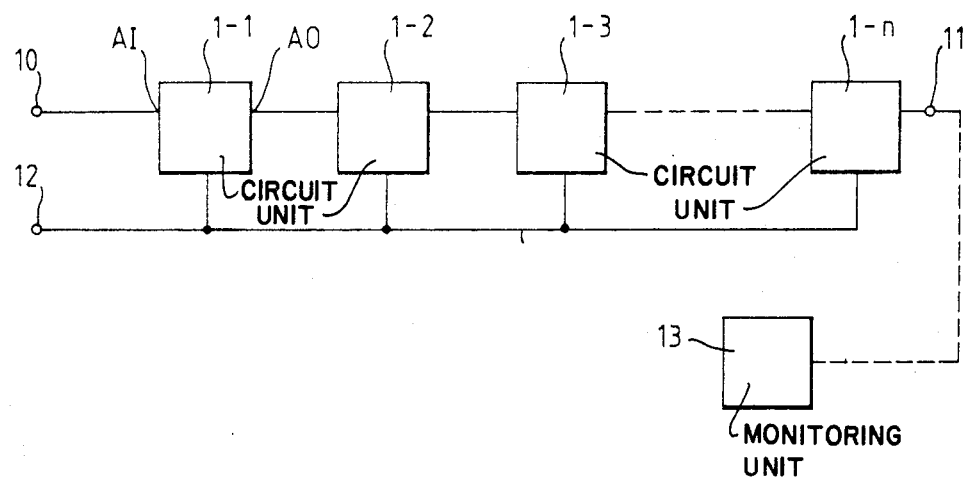
FIG. 1 shows in block schematic form a first embodiment of a circuit arrangement according to the invention.

FIG. 1 shows a circuit arrangement comprising a plurality of circuit units 1-1 to 1-n each having an input AI for receiving a control signal and an output AO, the units being arranged in sequence such that the AO output of each is connected to the AI input of the succeeding unit. The circuit unit may take many forms, for example individual integrated circuits, complete printed circuit boards, or computer terminals. The AI input of the first unit 1-1 is connected to an input terminal 10 while the AO output of the last unit 1-n is connected to an output terminal 11. A terminal 12 to which, in operation, a clock signal is connected is connected to a clock input of each of the units 1-1 to 1-n. Each unit 1-1 to 1-n includes an address generator the state of which is modified in response to the clock signal until the control signal at its AI input is at a logical '1' and each unit is arranged to generate a logical '1' at its output AO on the clock pulse after a logical '1' appears at its AI input. A simple way to modify the state of the address generator in response to the clock signal is to form the address generator as a counting circuit and cause it to count applied clock pulses. Thus in this case the address will be incremented by each applied clock pulse. However the state of the address generator may be modified in any arbitary manner on the occurence of each clock pulse. For example, the address generator could be formed as a ready only memory with the clock pulses counting through memory addresses so that the contents of any memory location can be used as the circuit unit address. Thus, in the case where the address generators comprise counting circuits to generate addresses for each of the units 1-1 to 1-n a logical '1' is applied to terminal 10. On the next clock pulse this logical '1' appears at the control signal output AO of unit 1-1. The address generators of units 1-2 to 1-n are incremented but that of unit 1-1 is not since its has a logical '1' on its AI input. On the following clock pulse a logical '1' appears at the output AO of unit 1-2 and the address generators of units 1-3 to 1-n are again incremented but those of units 1-1 and 1-2 are not since both units have a logical '1' on their A1 inputs. This process is repeated until all the units 1-1 to 1-n have a logical '1' on their AI inputs and consequently the units 1-1 to 1-n are set to have incrementally increasing addresses along the length of the chain the actual address depending only on the position of the unit along the chain.

In order to detect that all the addresses have been set up the state of the terminal 11, which is connected to the AO output of unit 1-n, may be monitored to determine when it changes to a logical '1' by means of a monitoring unit 13. The unit 13 may include an audible or visible warning device, such as a lamp, which may indicate when the state of terminal 11 is at a logical '0' or which may be operated when the state of terminal 11 goes to a logical '1' to indicate that the address setting up procedure has been completed. The unit 13 may also or alternatively produce an output signal which may be fed to a system controller to indicate that the address generation phase has been completed and which may be applied directly or via a system controller to the circuit units. This signal may be effective to cause the AI and AO terminals of the circuit units to be disconnected from the address generator and be connected to other functional ciruits within the circuit units, for example interrrupt requesters/controllers. Alternatively the number of clock pulses applied may be counted to ensure that sufficient time has elapsed to enable all the addresses to be generated. If the alternative method is used however faulty units would not be detected and if the chain is broken some units will not generate their own addresses.

Figure 2:
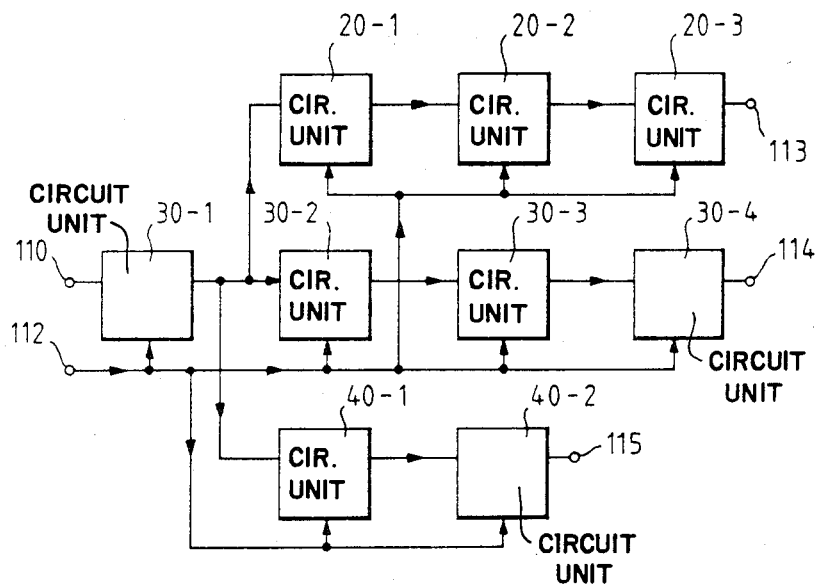
FIG. 2 shows in block schematic form a second embodiment of a circuit arrangement according to the invention.

FIG. 2 shows a circuit arrangement in which circuit units 20-1 to 20-3, 30-1 to 30-4, 40-1 and 40-2 are arranged in three branches. The circuit arrangement has an input 110 to which in order to generate addresses for the circuit units a signal is applied and an input 112 via which a clock signal is appied to each of the circuit units. In a similar manner to that described with respect to FIG. 1 when a logical '1' is applied to the AI input of circuit unit 30-1 the clock signal is inhibited from incrementing the address generator in circuit unit 30-1 but the address generators in all the other circuit units are incremented and at the same time the logical '1' on the AI input of unit 30-1 is transferred to its AO output. On the next clock pulse the address generators of circuit units 20-1, 30-2 and 40-1 are also inhibited and a logical '1' is transferred to their AO outputs while the address generators of the other circuit units are once again incremented. This process is continued until all the units have set up their addresses i.e. a logical '1' appears on output terminals 113, 114 and 115.

A construction similar to that shown in FIG. 2 may be useful when each unit has an address comprising a fixed part which is related to the unit type and is built into the unit during manufacture and a variable part which defines the unit number within the unit type. Thus, for example the units 20-1 to 20-3 may be RAMs, the units 30-1 to 30-4 ROMs and the units 40-1 and 40-2 display drivers.

Figure 3:
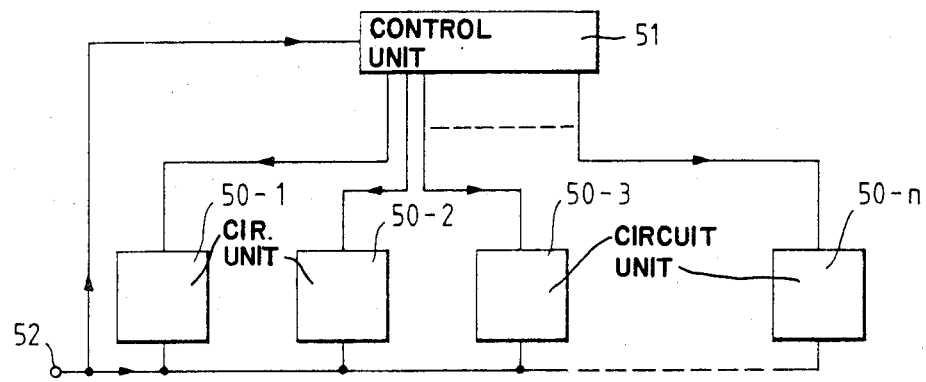
FIG. 3 shows in block schematic form a third embodiment of a circuit arrangement according to the invention.

FIG. 3 shows an alternative embodiment in which the circuit units 50-1 to 50-n are not connected in a daisy chain but have their AI inputs connected to the outputs of a control arrangement 51. The control arrangement may be, for example, a shift register or a read only memory (ROM) or may be a microprocessor controlled circuit. A clock signal is applied to terminal 52 and the address generators within the circuit units 50-1 to 50-n are incremented so long as their AI inputs remain at a logical '0'. The clock pulses also cycle the control arrangement 51 so that the state of the AI inputs of the individual circuit units can be appropriately set in synchronism with the clock pulses. Since in this embodiment the address generator control signal is not passed from unit to unit the AO output is not required.

In some circumstances it may be desired to modify the addresses of the circuit units and the arrangement of FIG. 3 may be used for this purpose if the address generators are modified to that they can be reset other than by switching off the power. This could be achieved by providing a further input on the circuit units to which a signal may be applied to reset the address generator. Alternatively the power may be switched off when address re-allocation is to be made.

Figure 4:
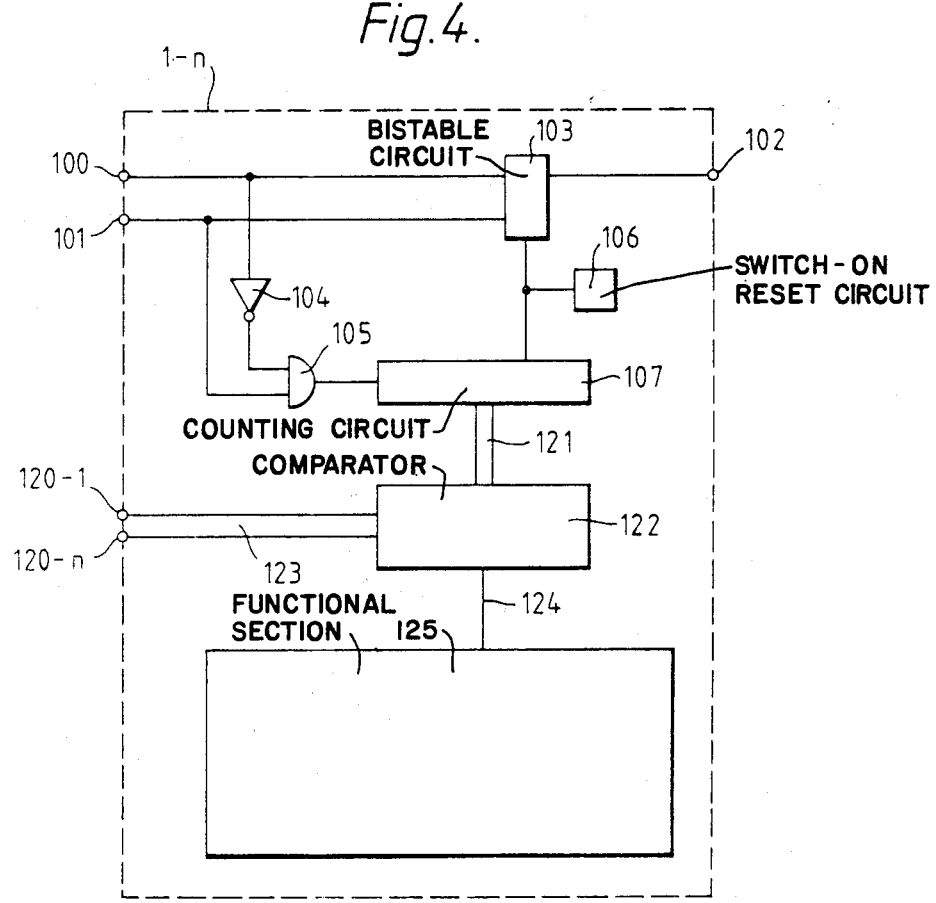
FIG. 4 shows a first embodiment of an electrical circuit unit according to the invention which is suitable for use in the circuit arrangement shown in FIGS. 1 or 2.

FIG. 4 shows a circuit diagram of a circuit unit 1-n according to the invention which is suitable for inclusion in the arrangements of FIGS. 1, 2 or 3. The circuit unit has a first terminal 100 which corresponds to the control signal input AI of the units of FIGS. 1, 2 and 3, a second terminal 101 which corresponds to the clock input of the circuit units and a third terminal 102 which corresponds to the control signal output AO of the units of FIGS. 1 and 2. The terminal 101 is connected to the D input of a D-type bistable circuit 103 and via an inverter 104 to a first input of an AND gate 105. The terminal 101 is connected to the clock input of the D-type bistable circuit 103 and to a second input of the AND gate 105. The AND gate 105 and the inverter 104 form a control circuit. A switch-on reset circuit 106, which generates a reset signal of a desired duration when power is first applied, is connected to reset inputs of the D-type bistable 103 and counting circuit 107. The output of AND gate 105 is connected to a clock input of the counting circuit 107 and the Q output of the D-type bistable 103 is connected to terminal 102.

When power is applied to the arrangement the circuit 106 generates a pulse which resets the D-type bistable 103 so that its Q output is at a logical '0' and resets the counting circuit to an initial state which may be, but is not necessarily, all zeros. If the signal at terminal 100 is at a logical '0' and clock pulses are applied to terminal 101 the counting circuit 107 will be incremented by each clock pulse and the D-type bistable 103 will remain reset and therefore a logical '0' will remain on terminal 102. When the signal on terminal 100 goes to a logical '1' the AND gate 105 will be blocked and no clock pulses will be applied to the counting circuit 107 and thus it will no longer be incremented. Further the D-type bistable 103 will change state on the occurrence of the first clock pulse after the logical '1' appears on input 100 thus causing a logical '1' to appear on output 102. Consequently by connecting the address generators in a chain they can be made to produce incrementally increasing addresses along the length of the chain. The counting circuit 107 which may take the form of for example a binary counter or a shift register determines the address of its circuit unit by the state of its outputs. The circuit unit is further provided with an address decoder for decoding incoming addresses. The incoming address may be in serial or parallel form depending on the system design and the circuit unit will contain appropriate address decoding circuitry.

As shown in FIG. 4 the circuit unit 1-n is arranged to receive and decode addresses present in parallel form on inputs 120-1 to 120-n. These inputs are connected via an n bit highway 123 to a comparator 122. The outputs of the counting circuit 107 are applied via a further n bit highway 121 to the comparator 122. When the applied address and the address contained in the counting circuit 107 correspond, an output is generated on line 124 and fed to a functional section 125 of the circuit unit.

Various other arrangements for receiving and decoding addresses are possible and would be readily apparent to one skilled in the art, for example the addresses may be received serially over a single line and applied to a serial/parallel converter such as a series in-parallel out shift register. Such an arrangement reduces the number of addressing pins required but increases the time necessary to receive and recongnize an address.

The clock input 101 may serve a dual purpose in that a system clock may be necessary for the operation of the functional part 125 of the circuit unit and in that case will not require an increase in the number of input terminals needed by the circuit unit. Further the circuit unit may include its own internal clock generator and an output of this clock generator may be used to increment the address generator provided that the clock generators of all the circuit units are synchronized.

The counting circuit 107 may be any circuit which is capable of stepping through a number of states in response to a clock signal and could for example, be a read only memory whose memory locations are addressed in turn by means of the clock pulses. Thus non-sequential addresses could be generated in a simple manner.

The A1 input 100 and AO output 102 could be dual purpose inputs/outputs. Thus, if the circuit units form part of a computer system (micro, mini, or main frame) interrupt lines and/or bus priority lines could be daisy chained in order to initially generate the circuit unit addresses and then returned to their other function by incorporating appropriate logic circuity within the circuit units and central processor. It is, of course, necessary in that case to ensure that the address, once set up, is retained by the circuit unit until any possible instruction to alter the address is generated within the arrangement.

The D-type bistable 103 forms a sub-arrangement of the control arrangement for the circuit arrangements as shown in FIGS. 1 and 2. In these embodiments the control arrangement is, at least partly, distributed in the circuit units. This allows the control arrangement to be automatically extended to accommodate additional circuit units merely by adding the circuit unit.

Figure 5:
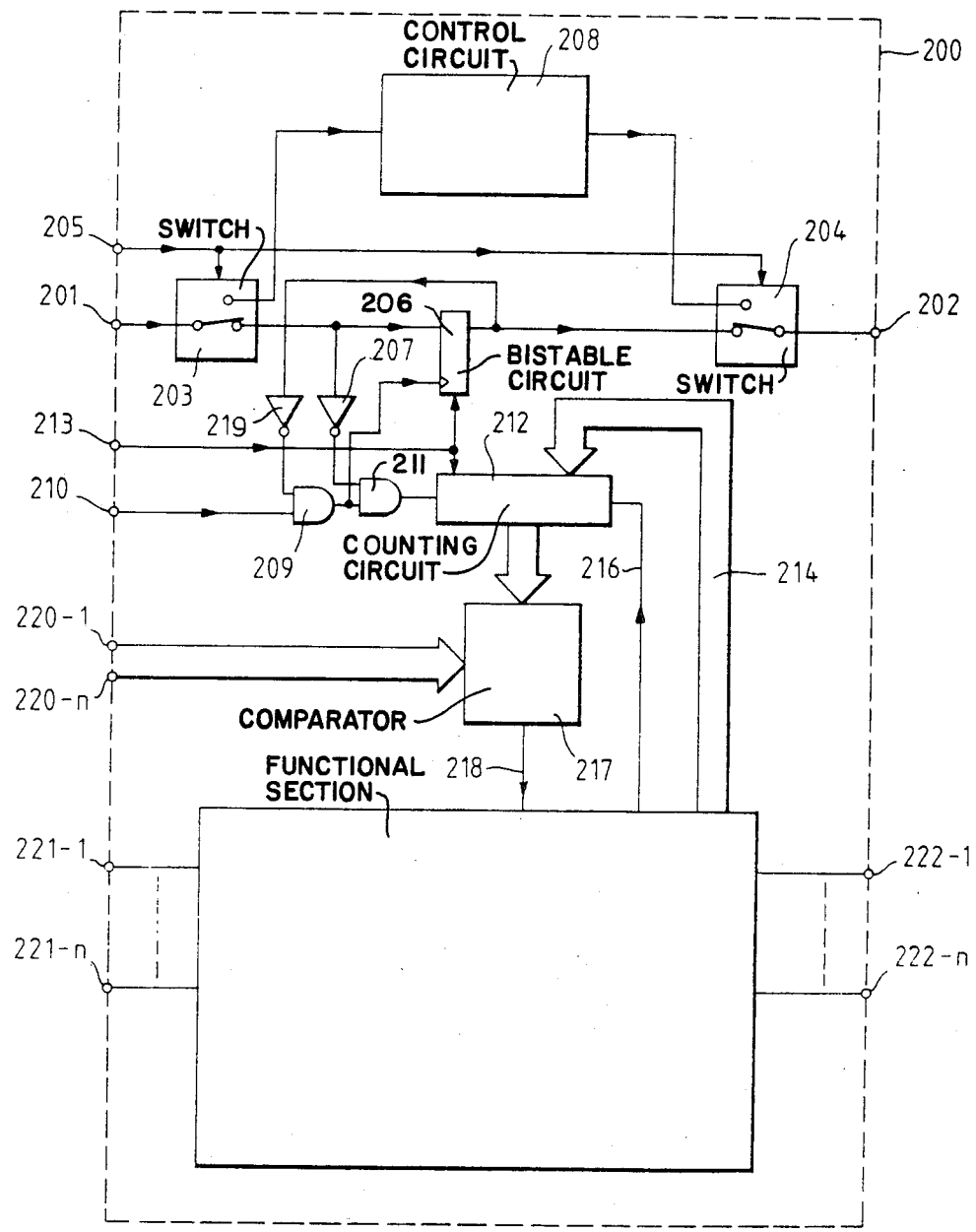
FIG. 5 shows a second embodiment of an electrical circuit unit according to the invention which is suitable for use in the circuit arrangement shown in FIGS. 1 or 2.

The circuit unit 200 shown in FIG. 5 includes means for enabling dual use of the AI and AO pins and for changing the address of the circuit unit after the initial address has been set. A terminal 201 forms the AI input and a terminal 202 forms the AO output. The terminal 201 is connected to the pole of a changeover switch 203 while the terminal 202 is connected to the pole of a changeover switch 204. A terminal 205 is connected to a control input of both changeover switches 203 and 204. A first contact of the changeover switch 203 is connected to the D-input of a D-type bistable circuit 206 and to the input of an inverter 207 while a second contact of the changeover switch 203 is connected to an input of an interrupt control circuit 208. The output of the interrupt control circuit 208 is connected to a second contact of the changeover switch 204 while the Q output of the D-type bistable ciruit 206 is connected to a first contact of the changeover switch 204 and is connected to a first contact of the changeover switch 204 and to a first input of an AND gate 209 via an inverter 219. A terminal 210 is connected to a second input of the AND gate 209 while the output of the AND gate 209 is connected to a first input of an AND gate 211 and the clock input of the D-type bistable circuit 206. The output of the inverter 207 is connected to a second input of the AND gate 211 while the output of AND gate 211 is connected to a clock input of a counting circuit 212. A terminal 213 is connected to reset inputs of the D-type bistable circuit 206 and the counting circuit 212. The counting circuit 212 also has inputs to which a data highway 214 is connected, the data highway 214 also being connected to the functional portion 215 of the circuit unit 200. A control line 216 is also connected between the counting circuit 212 and the functional portion 215. The outputs of the counting circuit 212 are connected to a first set of inputs of a comparator 217 while terminals 220-1 to 220-n are connected to a second set of inputs of the comparator 217. The comparator output is fed via a line 218 to the functional portion 215. Further input terminals 221-1 to 221-n and output terminals 222-1 to 222-n are connected to the functional portion 215.

In operation an initialization signal is applied to terminal 213 to set bistable ciruit 206 to the state when its Q output is at a logical '0' and to set the counting ciruit to a desired initial state. This signal may also be applied to the switching circuits 203 and 204 to cause them to adopt the state shown in the drawing instead of or as well as the terminal 205. Alternatively the initialization signal may be generated within the circuit unit when pwoer is first supplied. A system clock signal is fed via terminal 210 to one input of the AND gate 209 and its passed through the gate until the bistable 206 changes state. As with the circuit unit shown in FIG. 4 the counting circuit 212 will be incremented by the clock pulses until a logical '1' appears on terminal 201. When this occurs the gate 211 no longer passes clock pulses to the counting circuit 212 and the next clock pulse causes the bistable 206 to change state after which no further clock pulses pass through the AND gate 209 and a logical '1' is transferred to the AO output 202. Thus far the operation of the address generation circuitry is identical to that shown in FIG. 2 apart from the feedback from the Q output of bistable 206 to the clock input the purpose of which will be described hereinafter.

When the address of all the circuit units have been set up a signal on terminal 205, which may, for example, be generated by the monitoring unit 13 of FIG. 1, causes the switches 203 and 204 to change state so that terminals 201 and 202 may be used for other purposes, for example an interrupt daisy chain. When this occurs the logical '1' may be removed from the D input of the bistable circuit 206 but the bistable circuit 206 is prevented from changing state since the logical '1' on the Q output which is fed via the inverter 219 to the AND gate 209 prevents clock pulses from being fed to its clock input.

The state of outputs of the counting circuit 212 is compared with that of addressing signals on terminals 220-1 to 220-n and if correspondence is detected an output is applied on line 218 to the functional portion 215. This then enables the functional portion to receive information from or transmit information to the rest of the system via the terminals 221-n to 221-n and 222-1 to 222-n. These terminals may be devoted exclusively to input or output functions or may be bi-directional. The construction of the functional portion is not relevant to the invention apart from the possibility of subsequent address modification.

Address modification may be achieved as follows. If the counting circuit is formed by presettable binary or decade counters, such as the 74196 or 74197 TTL integrated circuits, the initial address may be allocated as described and subsequently modified by applying signals to the presetting inputs. Thus the functional portion 215 may receive an instruction from a system controller and in response thereto put data onto the highway 214 which is fed to the presetting inputs of the counters under the control of a signal on line 216 which is applied to the parallel load pin of the counters.

Figure 6:
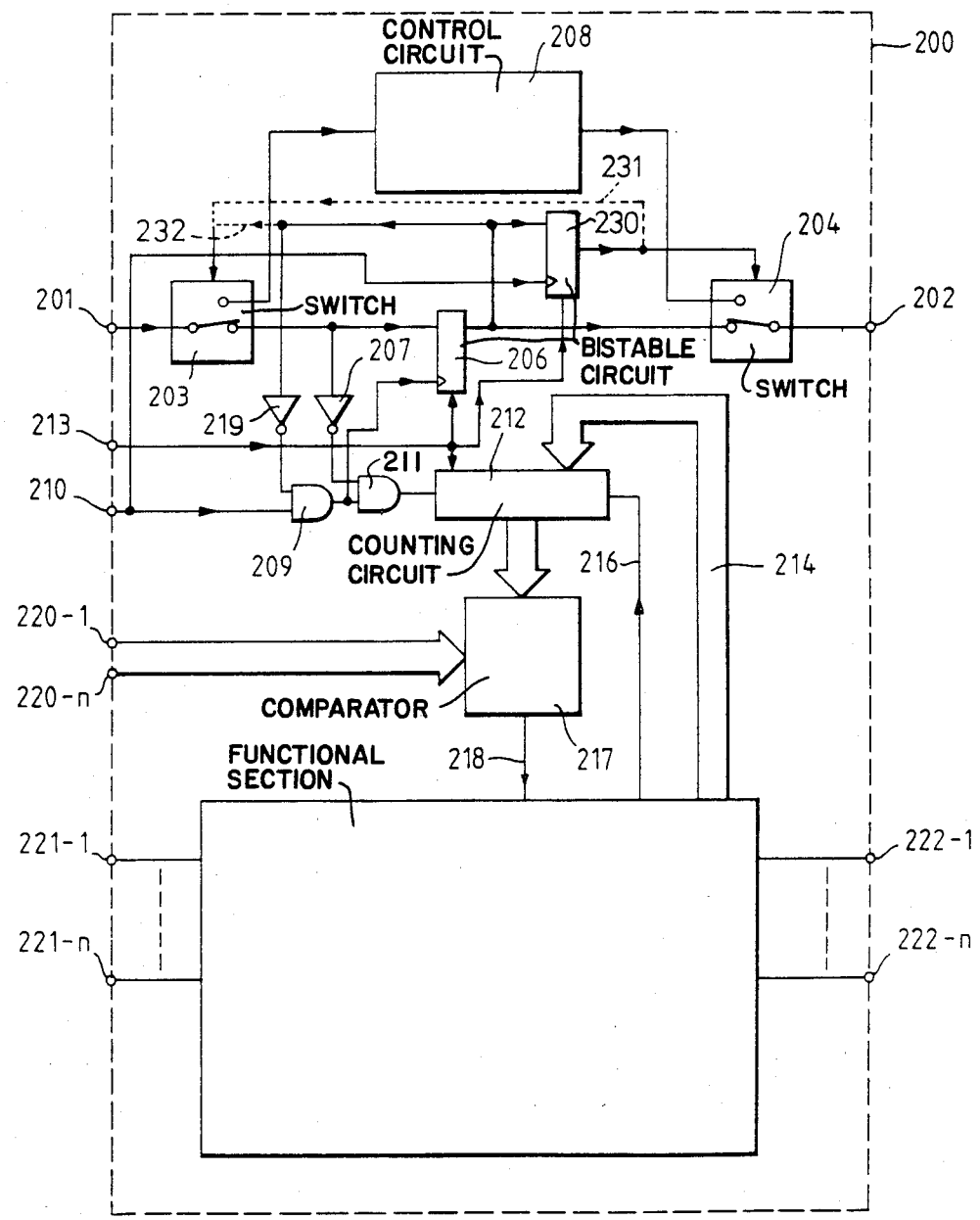
FIG. 6 shows a third embodiment of an electrical circuit unit according to the invention which is suitable for use in the circuit arrangement shown in FIGS. 1 and 2.

The circuit unit 200 shown in FIG. 6 is similar to that shown in FIG. 5. The differences between the two circuit units are concerned with the method of changing the use of the terminals 201 and 202. The circuit unit 200 of FIG. 6 dispenses with the external connection 205 by generating the control signal which causes the switches 203 and 204 to change state internally. The circuit unit 200 of FIG. 6 comprises a D-type bistable circuit 230 having its reset input connected to terminal 213 and its clock input connected to terminal 210. The D-input of the bistable 230 is connected to the output of the D-type bistable circuit 206 while the output of bistable 230 is connected to the control input of the changeover switch 204. The control input of the changeover switch 203 may be connected either to the output of the bistable 206 via line 232 or to the output of bistable 230 via line 231, the lines 231 and 232 being shown dotted to illustrate the alternative connections.

Thus, in operation, when a logical '1' appears on the control signal input 201 the bistable 206 will be set on the rising edge of the next clock pulse, thus transferring a logical '1' to the control signal output 202 with a delay through the circuit unit of one clock period, assuming that there is no signal delay between units. If the connection 232 is made then the changeover switch 203 will change state as soon as the output of bistable 206 changes state. One clock period later the bistable 230 will change state and cause the changeover switch 204 to change state thus disconnecting the address generating mechanism from the terminals 201 and 202 allowing them to be connected to, for example, the interrupt control circuit 208. If the connection 231 rather than the connection 232 is made them both changeover switches 203 and 204 will change state at the same time governed by the output of the bistable circuit 230.

Various modifications to the circuit unit shown in FIG. 5 would be readily apparent to one skilled in the art. For example, the changeover switches 203 and 204 may be set at the state shown by the initialization signal and changed over after a given number of clock pulses determined by a counter. An internal initial reset gnerator may be provided, as in the embodiment of FIG. 4, which would allow the terminal 213 to be omitted. The addresses may be applied to the circuit unit serially over a single line in which case the comparator may compare the incoming address with that stored on a bit by bit basis as the address arrives or it may be fed into a series to parallel converter. Any or all of the possibilities discussed with reference to FIG. 4 are equally applicable to the embodiment of FIG. 5 and vice versa and both embodiments may be used in the arrangements of FIGS. 1 and 2 and with appropriate modifications in that of FIG. 3.

I claim:

1. An electrical circuit arrangement comprising a plurality of circuit units connected to a common path, each of the circuit units having an input for receiving a control signal and including a control circuit, said control circuit having a first input for receiving a clock signal, a second input connected to the control signal input and an output connected to an input of an address generator, said address generator being provided for generating addresses in response to said clock signal applied thereto under control of said control signal, wherein said circuit arrangement further comprises a control arrangement for generating successive control signals synchronously with the clock signal, said control arrangement having a plurality of outputs, an individual output of the control arrangement being connected to the control signal input of a respective circuit unit.

2. A circuit arrangement as claimed in claim 1 in which said control arrangement comprises a parallel output shift register, each individual output of the shift register being connected to a respective output of the control arrangement.

3. A circuit arrangement as claimed in claim 1 or claim 2, wherein at least one circuit unit comprises means for enabling the control signal input to be used for other circuit functions once the address generator has generated the address.

4. A circuit arrangement as claimed in claim 3, in which said enabling means comprises a changeover switch having its pole connected to the control signal input, a first contact connected to the second input of the control circuit and a second contact connected to a further portion of the circuit unit; and a clocked bistable circuit having an input connected to the control signal input and an output connected to a control input of the changeover switch, a change in the signal at the output of the bistable circuit being effective to cause the changeover switch to change state.

5. An electrical circuit arrangement comprising a plurality of circuit units connected to a common path, each of the circuit units having an input for receiving a control signal and including a control circuit having a first input for receiving a clock signal, a second input connected to the control signal input and an output connected to an input of an address generator, said address generator being provided for generating addresses in response to said clock signal applied thereto under control of said control signal, said circuit arrangement further comprising a control arrangement for generating successive control signals synchronously with the clock signal, said control arrangement comprising a sub-arrangement in each circuit unit, a first input of each sub-arrangement being connected to the control signal input of its respective circuit unit, said clock signal being applied to a second input of each sub-arrangement and an output of each sub-arrangement being connected to a control signal output of its respective circuit unit, each sub-arrangement being provided for generating one of said successive control signals subsequent to receipt of a control signal on its first input, the control signal output of each circuit unit being connected to the control signal input of at least one succeeding unit when present, at least one circuit unit comprising means for enabling the control signal input and the control signal output to be used for other circuit functions once the address generator has been generated the address.

6. A circuit arrangement as claimed in claim 5, in which said enabling means comprises; a first changeover switch having its pole connected to the control signal input, a first contact connected to the second input of the control circuit, and a second contact connected to a further portion of the circuit unit; a second changeover switch having its pole connected to the control signal output, a first contact connected to the output of the sub-arrangement, and a second contact connected to a further portion of the circuit unit; a first clocked bistable circuit having an input connected to the control signal input and an output connected to a control input of the first changeover switch, a change in the signal at the output of the first bistable circuit being effective to cause the first changeover switch to change state; and a second clocked bistable circuit having an input connected to the output of the first bistable circuit and an output connected to a control input of the second changeover switch, a change in the signal at the output of the second bistable being effective to cause the second changeover switch to change state.

7. A circuit arrangement as claimed in claim 5, in which said enabling means comprises; a first changeover switch having its pole connected to the control signal input, a first contact connected to the second input of the control circuit, and a second contact connected to a further portion of the circuit unit; a second changeover switch having its pole connected to the control signal output, a first contact connected to the output of the sub-arrangement, and a second contact connected to a further portion of the circuit unit; and a clocked bistable circuit having an input connected to the output of the sub-arrangement and an output connected to control inputs of the first and second changeover switches, a change in the signal at the output of the bistable circuit being effective to cause the first and second changeover switches to change state.

8. A circuit arrangement as claimed in claim 5, in which the application of the clock signal to the address generator of a circuit unit is inhibited in response to the control signal applied to the control signal input of that circuit unit.

9. A circuit arrangement as claimed in claim 5, in which each sub-arrangement comprises a clocked bistable circuit having an input connected to the control signal input of its associated circuit unit, an output connected to the control signal output of its associated circuit unit, and a clock input for receiving the clock signal.

10. A circuit arrangement as claimed in claim 5, in which the control signal input of the first circuit unit is connected to an external reference potential source.

11. An electrical circuit arrangement comprising a plurality of circuit units connected to a common path and a control arrangement for generating successive control signals synchronously with a clock signal: in which each circuit unit comprises (a) a control signal input for receiving a control signal,
(b) a control signal output for outputting a control signal,
(c) a control circuit,
(d) an address generator, and
(e) a sub-arrangement of said control arrangement:

wherein said control circuit has a first input for receiving said clock signal, a second input connected to said control signal input and an output connected to an input of said address generator; said address generator is provided for generating addresses in response to said clock signal, said clock signal being applied to said address generator under the control of said control signal; said sub-arrangement having a first input connected to the control signal input, a second input for receiving said clock signal, and an output connected to the control signal output, said sub-arrangement being provided for generating one of said one of said successive control signals at its output subsequent to the receipt of a control signal at its first input;

and wherein the circuit units are arranged such that the control signal output of one is connected to the control signal input of the next, if present, the control arrangement is arranged to supply a signal to the control signal input of the first circuit unit, and the control circuit of each circuit unit is arranged to inhibit the application of said clock signal to the address generator when a control signal is applied to the control signal input of that circuit unit.

12. An electrical circuit arrangement as claimed in claim 5, in which in each circuit unit the sub-arrangement generates its control signal one period of the clock signal subsequent to the receipt of the control signal at its input.

13. A circuit arrangement as claimed in claim 11, characterized in that at least one circuit unit comprises means for enabling the control signal input and/or the control signal output to be used for other circuit functions once the address generator has generated the address.

14. A circuit arrangement as claimed in claim 5, comprising means for monitoring the state of the control signal output of the last circuit unit in the sequence.

15. A circuit arrangement as claimed in claim 14, in which said enabling means the control signal input and/or output to be used for other purposes is operable in response to a signal produced by said monitoring means.

16. A circuit arrangement as claimed in any one of claims 1, 2 and 7 to 11, characterized in that at least one circuit unit comprises means for changing the address generated by the address generator in response to appropriate signals applied to the circuit unit.

17. An electrical circuit unit for use in an electrical circuit arrangement as claimed in claim 1 or claim 2, said circuit unit comprising an input for receiving a control signal, a control circuit, and an address generator, said control circuit having a first input for receiving a clock signal, a second input connected to the control signal input and an output connected to an input of the address generator, said address generator being provided for generating addresses in response to said clock signal applied thereto under control of said control signal.

18. A circuit unit as claimed in claim 17, comprising means for enabling the control signal input to be used for other circuit functions once the address generator has generated the address.

19. An electrical circuit unit for use in an electrical circuit arrangement as claimed in claim 5, said circuit unit comprising an input for receiving a control signal, an address generator, a control circuit and a control signal output, said control circuit having a first input for receiving a clock signal, a second input connected to the control signal input and an output connected to an input of the address generator, said address generator being provided for generating addresses in response to said clock signal applied thereto under control of said control signal, said circuit unit further comprising a control sub-arrangement for generating a control signal synchronously with the clock signal, a first input of each sub-arrangement being connected to the control signal input of its respective circuit unit, said clock signal being applied to a second input of each sub-arrangement and an output of each sub-arrangement being connected to a control signal output of the respective circuit unit, the sub-arrangement being provided for generating one of said successive control signals subsequent to receipt of a control signal on its first input.

20. A circuit unit as claimed in claim 19. comprising means for enabling the control signal input and the control signal output to be used for other circuit functions once the address generator has generated the address.

21. An electrical circuit arrangement as claimed in claim 11, in which in each circuit unit the sub-arrangement generates its control signal one period of the clock signal subsequent to the receipt of the control signal at its input.

22. A circuit arrangement as claimed in claim 11, comprising means for monitoring the state of the control signal output of the last circuit unit in the sequence.

23. An electrical circuit unit for use in an electrical circuit arrangement as claimed in claim 11, said circuit unit comprising an input for receiving a control signal, an address generator, a control circuit and a control signal output, said control circuit having an first input for receiving a clock signal, a second input connected to the control signal input and an output connected to an input of the address generator, said address generator being provided for generating addresses in response to said clock signal applied thereto under control of said control signal, said circuit unit further comprising a control sub-arrangement for generating a control signal synchronously with the clock signal, a first input of each sub-arrangement being connected to the control signal input of its respective circuit unit, said clock signal being applied to a second input of each sub-arrangement and an output of each sub-arrangement being connected to a control signal output of the respective circuit unit, the sub-arrangement being provided for generating one of said successive control signals subsequent to receipt of a control signal on its first input.

24. A circuit unit as claimed in claim 23, comprising means for enabling the control signal input and the control signal output to be used for other circuit functions once the address generator has generated the address.

25. A circuit arrangement as claimed in claim 22, in which said enabling means the control signal input and/or output to be used for other purposes is operable in response to a signal produced by said monitoring means.

* * * * *